United States Patent [19]
Sellstedt

[11] 3,880,876
[45] Apr. 29, 1975

[54] PROCESS FOR THE PREPARATION OF 6-ARYL-4H-S-TRIAZOLO-[4,3-A][1,4]BENZODIAZEPINES

[75] Inventor: John H. Sellstedt, King of Prussia, Pa.

[73] Assignee: American Home Products Corporation, New York, N.Y.

[22] Filed: Nov. 3, 1972

[21] Appl. No.: 303,589

[52] U.S. Cl............................... 260/308 R; 260/999
[51] Int. Cl............................................ C07d 99/02
[58] Field of Search .................. 260/308 R

[56] References Cited
UNITED STATES PATENTS
3,767,660  10/1973  Hester............................ 260/308 R

*Primary Examiner*—Henry R. Jiles
*Assistant Examiner*—Robert T. Bond
*Attorney, Agent, or Firm*—Royal E. Bright

[57] ABSTRACT

A process for the preparation of 6-aryl-4H-s-triazolo[4,3-a][1,4]benzodiazepines from 2-halo-5-aryl-3H-1,4-benzodiazepines, and carboxylic acid hydrazides. The products are known CNS depressants with low toxicity.

1 Claim, No Drawings

PROCESS FOR THE PREPARATION OF 6-ARYL-4H-S-TRIAZOLO-[4,3-A][1,4]BENZODIAZPEDINES

BACKGROUND OF THE INVENTION

6-Phenyl-4H-s-triazolo[4,3-a][1,4]benzodiazepines have previously been reported by Hester, et al, in the Journal of Medicinal Chemistry, Vol. 14, p. 1078, (1971), as being prepared from 1,3-dihydro-5-phenyl-2H-1,4-benzodiazepine-2-thiones and carboxylic acid hydrazides.

The present invention provides an alternative synthesis for 6-aryl-4H-s-triazolo[4,3-a][1,4]benzodiazepines.

SUMMARY OF THE INVENTION

The invention sought to be patented in its principal process aspect resides in the concept of a process for the preparation of 6-aryl-4H-s-triazolo[4,3-a][1,4]benzodiazepine of the formula:

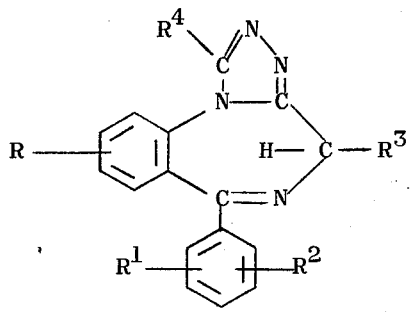

wherein R is hydrogen, lower alkyl, lower alkoxy, phenyl, lower alkoxyphenyl, phenyl(lower)alkyl, heteroaryl, halo, trifluoromethyl, nitro, di(lower)alkylamino, carbalkoxy, lower alkyl thio, lower alkyl sulfonyl, lower alkyl sulphinyl, or cyano; $R^1$ is hydrogen, lower alkyl, lower alkoxy, phenyl, lower alkoxyphenyl, phenyl(lower)alkyl, heteroaryl, halo, trifluoromethyl, nitro, di(lower)alkylamino, carbalkoxy, lower alkyl thio, lower alkyl sulfonyl, lower alkyl sulphinyl, or cyano; $R^2$ is hydrogen, lower alkyl, lower alkoxy, phenyl, lower alkoxyphenyl, phenyl(lower)alkyl, heteroaryl, halo, trifluoromethyl, nitro, di(lower)alkylamino, carbalkoxy, lower alkyl thio, lower alkyl sulfonyl, lower alkyl sulphinyl, or cyano, with the proviso that $R^1$ and $R^2$ are not adjacent trifluoromethyl; $R^3$ is hydrogen, lower alkyl, lower alkoxy, lower acyloxy, or halo; $R^4$ is hydrogen, lower alkyl, lower alkoxy, lower alkoxyphenyl, heteroaryl, phenyl(lower)alkyl, di(lower)alkylamino, carbalkoxy, or trifluoromethyl; which comprises:

a. treating in the presence of a hydrogen halide absorber, a 2-halo-5-aryl-3H-1,4-benzodiazepine of the formula:

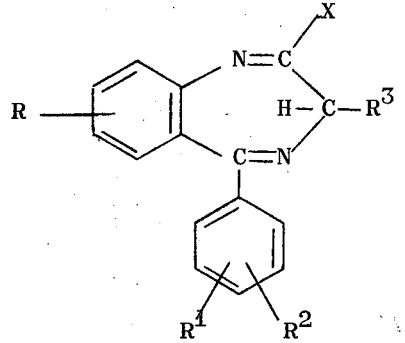

wherein R, $R^1$, $R^2$, and $R^3$ are as defined hereinabove, and X is halo with a carboxylic acid hydrazide of the formula:

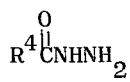

wherein $R^4$ is as defined hereinabove; to prepare a compound of the formula:

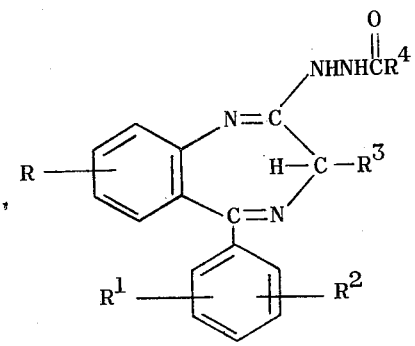

wherein $R^1$, $R^2$, $R^3$, and $R^4$ are as defined hereinabove; and b. heating.

The tangible embodiments produced by the principal process aspect of the invention possess the inherent general physical properties of being crystalline solids, being substantially insoluble in water, and generally soluble in such common organic solvents as chloroform, dichloromethane, acetone, ethyl acetate and the like.

Examination of the product produced by the aforesaid process reveals, upon infrared and nuclear magnetic resonance spectrographic analysis, spectral data supporting the molecular structure hereinbefore set forth.

The tangible embodiments produced by the principle process aspect of the invention possess the inherent applied use characteristics of exerting CNS depressant activity while having low toxicity in experimental animals as evidenced by pharmacological evaluation according to standard test procedures.

The invention sought to be patented in a subgeneric process aspect if described as residing in the concept of a process for the preparation of 6-aryl-4H-s-triazolo[4,3-a][1,4]benzodiazepines of the formula:

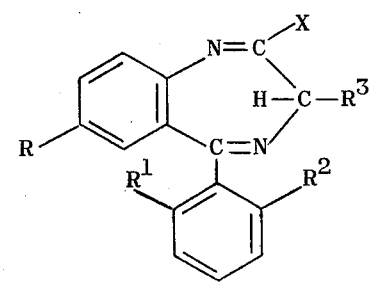

wherein R is hydrogen, halo, trifluoromethyl, nitro, or thiomethyl; $R^1$ is hydrogen or halo; $R^2$ is hydrogen or halo; $R^3$ is hydrogen, lower alkyl, lower alkoxy, lower acyloxy, or halo; and R⁴ is hydrogen, lower alkyl, or lower alkoxyphenyl; which comprises:

a. treating in the presence of a hydrogen halide acceptor, a 2-halo-5-aryl-3H-1,4-benzodiazepine of the formula:

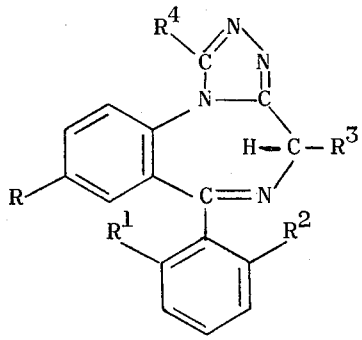

wherein R, R¹, R², and R³ are as described immediately hereinabove, and X is halo; with a carboxylic acid hydrazide of the formula:

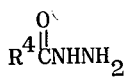

wherein R⁴ is as defined immediately hereinabove; to prepare a compound of the formula:

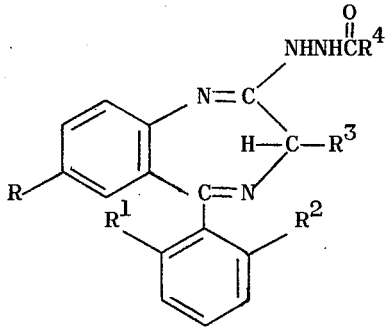

wherein R¹, R², R³, R⁴ are as defined immediately hereinabove; and b. heating.

DESCRIPTION OF THE PREFERRED EMBODIMENT

As shown in FIG. A, treating acethydrazide (II) in pyridine with 2,7-dichloro-5-(o-chlorophenyl)-3-methoxy-3H-1,4benzodiazepine (I) at reduced temperature, preferably 0° to 10°, followed by an extended period at room temperature, conveniently 18 hours produces acetic acid-2-[7-chloro-5-(o-chlorophenyl)-3-methoxy-3H-1,4-benzodiazepine-2-yl]-hydrazide (III).

(III) may be converted to the desired 8-chloro-6-(o-chlorophenyl)-4-methoxy-1-methyl-4H-s-triazolo[4,3-a][1,4]benzodiazepine (IV) by two alternate modes of heating. The pyridine solution may be heated to elevated temperature, conveniently reflux temperature for a short period of time conveniently 2 to 6 hours, or alternatively the hydrazide (III) may be isolated and freed of solvents by standard methods, and then dry heated to above 200° until evolution of gas becomes essentially minimal. Isolation of the product may then be accomplished by standard means.

In addition to pyridine, the reaction solvent and hydrogen halide absorber described, many other suitable single or combination solvents and hydrogenhalide absorbers will occur to the skilled organic chemist. Among these will be such combinations as triethylamine, pyridine, or methylmorpholine in benzene or toluene; pyridine or triethylamine in dimethyl formamide; and triethylamine.

While the process has been specifically illustrated with reference to FIG. A which describes the preparation of 8-chloro-7-(o-chlorophenyl)-4-methoxy-1-methyl-4H-s-triazolo[4,3-a][1,4]benzodiazepine, it will be obvious to the skilled organic chemist to substitute any of the variously substituted starting materials, and obtain the various 6-aryl-4H-s-triazolo[4,3-a][1,4]benzodiazepines contemplated to be prepared by the invention.

Starting materials for the practice of the invention, namely the aforementioned 2-halo-5-aryl-3H-1,4-benzodiazepines may be prepared by treatment of the corresponding 5-aryl-3H

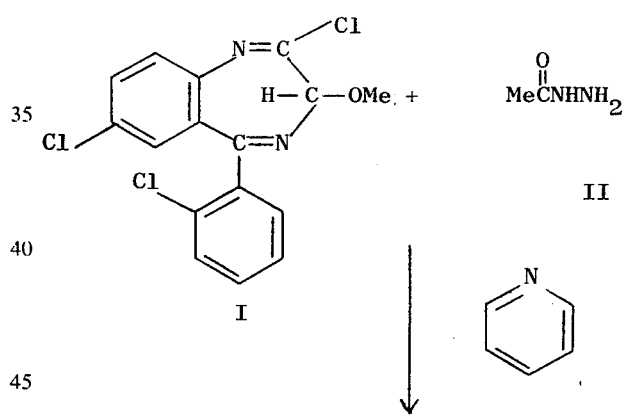

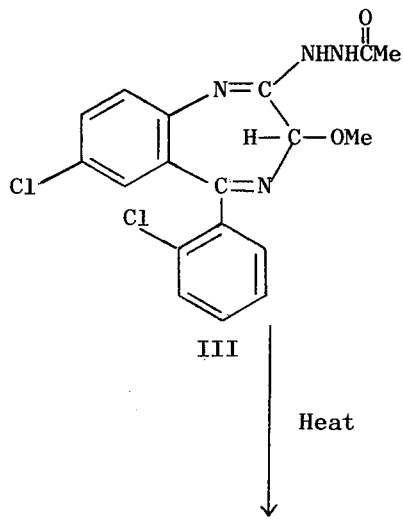

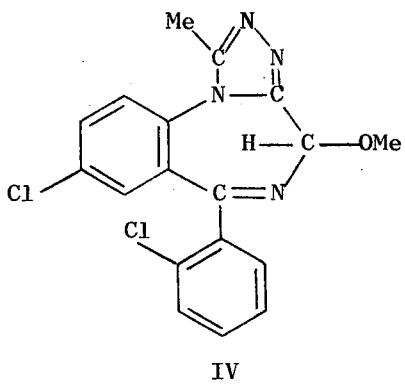

IV 1,4-benzodiazepine-2-ones with a halogenating agent as described in the copending Sellstedt application Ser. No. 293,701 filed Sept. 29, 1972. The preparation of 5-aryl-3H-1,4benzodiazepin-2-ones is described in the article "The Chemistry of Benzodiazepines" by Giles A. Archer and Leo H. Sternbach in Chemical Reviews, Volume 68, page 747 (1968), and the references cited therein. The other necessary starting materials for the practice of the invention namely the carboxylic acid hydrazides are compounds either commercially available or obtainable by synthetic methods well-known in the chemical literature.

6-aryl-4H-s-triazolo[4,3-a][1,4]benzodiazepines, the tangible embodiments produced by the present invention are useful as CNS depressant agents as reported by Hester, et al., in The Journal of Medicinal Chemistry, Volume 14, page 1073, (1971).

As used herein the term "lower alkyl" means a saturated hydrocarbon radical including the straight and branched chain radicals of from 1 to 6 carbon atoms, among which are for the purposes of illustration, but without limiting the generality of the foregoing, methyl, ethyl and i-butyl. The term "heteroaryl" means an aromatic heterocyclyl radical containing from 3 to 5 carbon atoms, and one or more atoms selected from the group nitrogen, oxygen, and fulfur, among which are for the purposes of illustration, but without limiting the generality of the foregoing, 2-pyridyl, and 2-pyrimidinyl. The term halo means fluoro, chloro or bromo.

The following example further illustrates the best mode contemplated by the inventor for carrying out the invention.

EXAMPLE

8-Chloro-(o-Chlorophenyl)-4-Methoxy-1Methyl-4H-s-Triazolo[4,3-a][1,4]Benzodiazepine A. Acethydrazide (2.03 g., 0.0274 mole) is stirred at 0° to 10° in pyridine (60 ml.) and 2,7-dichloro-5-(o-chlorophenyl)3-methoxy-3H-1,4-benzodiazepine (9.70 g., 0.0274 mole) is added all at once. After stirring 2 hours at 0° to 10°, the mixture is kept at room temperature for 18 hours. The mixture is poured into water (600 ml.) and the precipitate separated by filtration. After drying at 30° in vacuo, the solid is heated to 200° under reduced pressure until gas evolution has virtually ceased. Crystallization of the semi-crystalline solid which results, from acetonitrile gives the title product m.p. 250°–252°.

B. Acethydrazide and 2,7-dichloro-5-(o-chlorophenyl)3-methoxy-3H-1,4-benzodiazepine are reacted in pyridine as described in part A above. The pyridine solution, after the 18 hour standing at room temperature, is heated to reflux for 4 hours, cooled and most of the pyridine distilled in vacuo. The residue is poured into water, the mixture filtered, and the resulting solid crystallized from acetonitrile and charcoal to give the title product m.p. 250–252°.

The subject matter which the applicants regard as their own invention is particularly pointed out and claimed as follows:

1. A process for the preparation of 8-chloro-6-(o-chlorophenyl)-4-methoxy-1-methyl-4H-s-triazolo[4,3-a][1,4]benzodiazepine which comprises: (a) treating 2,7-dichloro-5-(o-chlorophenyl)-3-methoxy-3H-1,4-benzodiazepine with acethydrazide in the presence of a hydrogen halide absorber; and (b) warming.

* * * * *